(No Model.)
B. J. BACON.
TAPPING COCK AND VALVE.
No. 471,413. Patented Mar. 22, 1892.
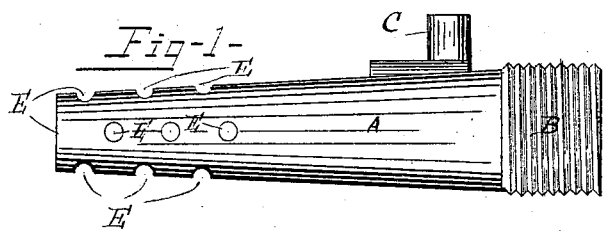
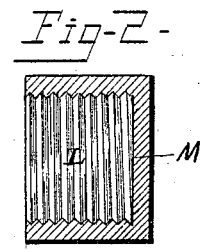
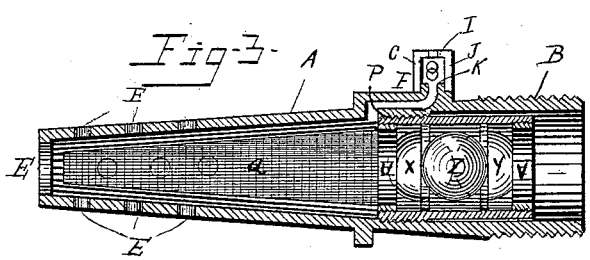
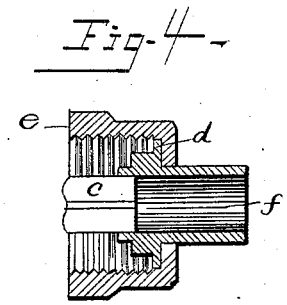
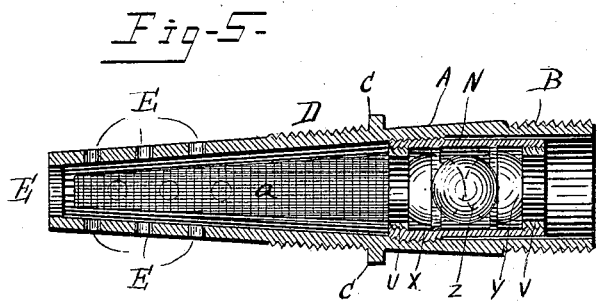
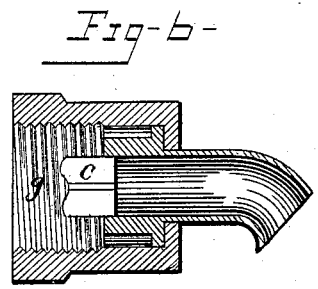
Figs-7- 8- 9- 10-11- 12- 13-
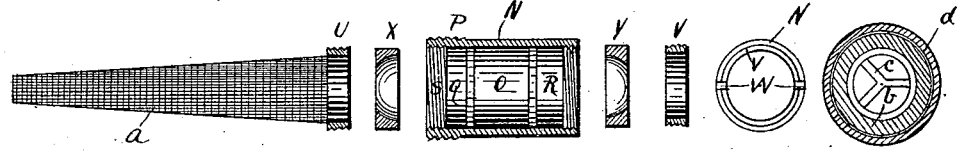
WITNESSES:
Louis S. Thomason
Charles J. Young
INVENTOR
Benjamin James Bacon
BY
Richards & Co.
ATTORNEYS.
THE NORRIS PETERS CO., PHOTO-LITHO., WASHINGTON, D. C.

UNITED STATES PATENT OFFICE.

BENJAMIN JAMES BACON, OF SYDNEY, NEW SOUTH WALES.

TAPPING COCK AND VALVE.

SPECIFICATION forming part of Letters Patent No. 471,413, dated March 22, 1892.

Application filed March 2, 1891. Serial No. 383,521. (No model.)

*To all whom it may concern:*

Be it known that I, BENJAMIN JAMES BACON, mechanical engineer, a British subject, residing at Sydney, in the Colony of New South Wales, Australia, have invented a new and useful invention for Improvements in Tapping Cocks and Valves; and I do hereby declare that the following is a full, clear, and exact description of the invention, which will enable others skilled in the art to which it appertains to make and use the same.

This invention relates to improvements in the construction of taps, valves, bib-cocks, and the like, used for tapping casks or other vessels for the purpose of extracting the fluid contained therein; and it consists in the matters referred to in the appended claims.

My invention is illustrated in the accompanying drawings, in which—

Figure 1 is an external view of the faucet or casing and air-vent. Fig. 2 is a screw-cap for protecting the end of the faucet when driven into position. Fig. 3 is a longitudinal section through the center of Fig. 1. Fig. 4 is a central longitudinal section of a coupling for forming connection to a beer engine or pump. Fig. 5 is a view similar to Fig. 3 with the addition of a collar. Fig. 6 is a form of bib-cock to be applied when the faucet is used as a tap only. Figs. 7, 8, 9, 10, 11, 12, and 13 are detail views of certain portions of the device, Fig. 7 being the strainer or filter with screw connection; Fig. 8, the inner valve-seating; Fig. 9, the valve-chamber; Fig. 10, the outer valve-seating; Fig. 11, the screwed ring keeping the outer valve-seat in position. Fig. 12 is an end view of the body or casing of the double-seating valve-chamber, and Fig. 13 is an end view of forms of cap and union and bib-cock shown in Figs. 4 and 6.

In the drawings, A represents the casing or faucet to which my improvements are to be applied. These improvements comprise a number of attachments, which will hereinafter be described. Formed at a convenient part of the faucet is a pipe, tube, or passage F, acting as an air-vent. This pipe, tube, or passage F has on its outer end, screwed or otherwise secured to it, a chamber G. This contains a single cup-shaped valve-seating J, upon which is seated the valve H, of ball shape, held in the chamber by a suitable locking-ring I. This valve H, when not seated, rests upon a perforated guard-plate K, so shaped as to cover the passage F without closing it, thus preventing the valve H from closing it, and thereby allowing the air to pass into the interior of the faucet and thence to the vessel. This air-vent is rendered operative during the working of a double-seating valve Z, placed within a removable chamber N in the faucet. This valve, as will be hereinafter shown, serves a twofold purpose—namely, as a draw-off or outlet tap or cock and as a foot or retention valve for a beer engine or pump.

The attachment placed within the faucet serving the twofold purpose before referred to consists of a casing N, having a valve-chamber O, provided with two suitable cup-shaped seatings X Y, (made, preferably, of india-rubber,) such seatings being held in position with screwed locking-rings U V or equivalent device fitting the chambers S T, formed in the ends of the casing N.

Q R are recesses in the casing N for the valve-seatings X Y to rest in upon their peripheries. To the inner locking-ring W is attached a strainer $a$, which it may be desirable to convert into a filtering-chamber, in which case the filtering material may be placed within the strainer, although, if desired, a concentric ring of compressed filtering material may be interposed between the strainer and the outer casing of the faucet. The valve-chamber casing N is secured within the faucet by means of a screw P upon its inner end. If desired, this screw may be dispensed with and the chamber made taper and driven into position, the screw being used, preferably, for convenience of withdrawal of the valve-chamber with strainer attached for cleansing purposes. Slits W are provided in the end of valve-chamber casing N and outer locking-ring V to facilitate the work of removal. A ball-valve Z is used where cup-headed seatings are employed; but where it may be considered advisable to use seatings with flat surfaces a correspondingly-suitable valve would be substituted. The valve may be made of any suitable substance, such as metal, glass, wood, gutta-percha or vulcanite.

No springs are necessary for the retention of the valve, as the outflow of the liquid gives the necessary pressure to hold it against the seating. The faucet or casing is made taper and provided at the small or inner end with perforations E, leading to a straining chamber and filter. The large or outer end of the faucet is provided with an external screw-thread B, upon which are fitted three classes of improved attachments, each to be used in conjunction with the inner valve-chamber. They may be fitted thereon in the order in which they are required to be used. One attachment is a driving-cap L, which protects the thread of the external screw from injury when it is desired to drive the faucet into the cask or vessel. When the faucet is used for the outflow of liquid not under great pressure, I use the vent-valve above referred to. The pressure of liquid within the vessel will cause the vent-valve to seat itself and prevent an outflow; but when the double-seating valve previously referred to is set in motion for the purpose of drawing off the liquid the vent-valve will rest upon the guard-plate, thus allowing an inflow of air, which continues only during the time the double-seating valve is working. Another is a similar cap e, pierced centrally to receive a union or lining b, which is the form of connection used when it is desired to connect with a beer engine or pump. Other kinds of unions may be used.

The inner end of the union or lining is provided with a collar j, having a packing-ring d. The body of the collar fits the largest part of the bore of the faucet and the packing-ring is placed upon the collar. Projecting beyond the collar j and fitted within the union or lining is a triangular-shaped projecting piece c, whose office is to thrust the valve inward away from the outer seating, which is done by simply screwing the cap upon the end provided for it. As it is being screwed home a projecting piece c enters the locking-ring V and, gradually pressing inward, displaces the valve and ultimately brings the packing-ring d close against the face of the faucet end, thus making an air-tight joint. It is obvious that the triangular projecting piece will not impede the outflow of the liquid.

While liquid is flowing out the valve will take its seating upon the cup end of the projecting piece; but when the beer engine or pump is being operated it will move alternately with the outward and backward pressures. By reason of the backward pressure it will take its seat upon the inner valve-seating and will retain the liquid in the connecting-pipe attached to the pump and prevent its return to the cask or vessel. The pipe is therefore fully charged whenever it is desirable to operate the beer engine or pump.

Another attachment consists of a screw-cap g and union made in the form of a bib-cock f. In this attachment the cap g may be screwed quite home and the projecting piece c will not displace the valve until the bib-cock f is pressed inward. When this is done, the collar j, previously mentioned, will enter the largest part of the bore of the faucet, and the packing-ring marked d will take its seating upon the end of the faucet, and not upon the end of the locking-ring and valve-chamber. A small catch p is provided upon the bib-cock f in such a position that when the bib-cock is pressed inward as far as desired this catch will enter a groove l, provided for it, and prevent the outward pressure upon the ball, displacing the bib-cock until it is desired to stop the outflow of the liquid.

To provide for screwing instead of driving the taper part of the faucet into the cask or vessel, a thread D is provided in the body of the faucet A, terminating against a collar C, placed near to the outer screw B. This collar may be hexagonal or square to fit a spanner. The faucet may be thus screwed into the wood or into a metal tube placed in the cask or vessel. These are alternative uses to which the faucet may be put.

Having thus described my invention, what I claim, and desire to secure by Letters Patent, is—

1. In a tapping-cock having a suitable chamber, a double-seating valve located in said chamber, seatings for the valve, locking-rings securing said seatings in position, an air-vent, an outwardly-closing valve H for said vent, controlled in co-operation with the double-seating valve by the movements and pressures of the liquid in the faucet, substantially as described.

2. In a tapping-cock having a suitable removable casing forming a chamber, a double-seating valve located in said chamber, seatings for the valve, locking-rings securing said seatings in position, and a strainer or filter attached to one of said locking-rings, substantially as described.

3. In a tapping-cock having a removable chamber, a double-seating valve located therein, seatings for the valve, locking-rings for securing the seatings in position, and a removable cap for said cock provided with a pipe or passage b, having on its inner end a projection adapted, when the cap is screwed into position, to move the double-seating valve from its outer seat, substantially as described.

4. In a tapping-cock having a removable chamber and a double-seating valve located in said chamber, a pipe or passage F, a guard-plate, as K, a chamber, as G, secured to the pipe or passage, a valve H in said chamber, and a locking-ring I, substantially as described.

In testimony whereof I have signed my name to this specification, in the presence of two subscribing witnesses, this 14th day of October, 1890.

BENJAMIN JAMES BACON.

Witnesses:
HARRY A. SMEDLEY,
ARTHUR J. STONE.